United States Patent [19]

Epstein

[11] Patent Number: 5,146,357

[45] Date of Patent: Sep. 8, 1992

[54] DATA COMMUNICATIONS SYSTEM THAT PREVENTS UNDESIRED COUPLING BETWEEN DATA STATIONS

[75] Inventor: Barry M. Epstein, Richardson, Tex.

[73] Assignee: Bufton Corporation, Ft. Worth, Tex.

[21] Appl. No.: 519,442

[22] Filed: May 4, 1990

[51] Int. Cl.⁵ .............................................. H04B 10/00
[52] U.S. Cl. ................................... 359/152; 359/110
[58] Field of Search ............... 455/602, 601, 606, 607, 455/617; 375/36; 250/551; 359/110, 152, 164

[56] References Cited

U.S. PATENT DOCUMENTS

| 4,225,752 | 9/1980 | Looschen | 455/602 |
| 4,596,048 | 6/1986 | Dunki-Jacobs | 455/602 |
| 4,638,167 | 1/1987 | LeSeure | 455/602 |
| 4,691,384 | 9/1987 | Jobe | 455/602 |

FOREIGN PATENT DOCUMENTS 0043943  3/1985  Japan ................................ 455/602

Primary Examiner—Edward L. Coles, Sr.
Assistant Examiner—Knife-Michael Negash
Attorney, Agent, or Firm—Terry M. Gernstein

[57] ABSTRACT

A data communications transceiver or configuration prevents undesired coupling between data stations by eliminating any connection between the ground path circuits of those data stations and line conductors connecting such stations together. The line conductors can be metallic and are coupled to the data stations by optical couplers. The optical couplers are powered from power sources that are totally separate and independent from any power sources associated with the data stations.

37 Claims, 8 Drawing Sheets

DATA COMMUNICATIONS SYSTEM THAT PREVENTS UNDESIRED COUPLING BETWEEN DATA STATIONS

TECHNICAL FIELD OF THE INVENTION

The present invention relates to the general art of data communications, and to the particular field of accurate directly coupled long distance data communication.

BACKGROUND OF THE INVENTION

In the early stages of data handling, data generators, such as computers, generally stood alone. As indicated in FIG. 1, each such computer $C_1$ and $C_N$ was, and still is, wired to a local ground where it is plugged into a source of power. A ground level lead GL travels throughout all of the computer logic and is at ground potential of a local ground. Peripheral equipment, such as terminals, printers, and the like, have their logic grounded in the same manner.

However, as technology advanced, a need developed to communicate between two such stations, such as between two computers, between one or more computers and a printer or display, or the like. A common means of connecting such units was, and still is, RS232 as indicated in FIG. 2. In RS232, one metallic conductor $M_1$ takes data signals $DS_1$ from unit T to unit R, and a second metallic conductor $M_2$ takes data signals $DS_2$ from unit R back to unit T. Still another metallic conductor $G_1$ ties the ground $G_T$ of the unit T to the ground $G_R$ of the unit R.

Many units, such as units T and R shown in FIG. 2, include other control leads $CL_T$ and $CL_R$ for "handshaking". The handshaking terminal of one unit will "ask" a corresponding handshaking terminal of a second unit if that second unit is ready to receive data signals, indicate that the terminal is on, and then wait for a return signal to indicate readiness. Upon receipt of a ready signal, the first terminal transmits data signals to the second terminal. Similar kissoff signals and sequences are used at the completion of a data signal transmission.

This control procedure for separate lines is rarely used today. Most RS232 users insert the handshaking and kissoff control into the normal data stream by using special characters such as $X_{ON}/X_{OFF}$, or ACK (acknowledge), NAK (negative acknowledge), or the like. Such simple control characters can be passed along with the data at no additional expense or additional hardware.

While successful, RS232 still has several drawbacks. One such drawback is a limit of about fifty feet for an RS232 connection. If the connection exceeds fifty feet, there is a possibility of a degradation of speed and accuracy of data transfer. Furthermore, there may even be a possibility that hardware can be damaged. Still another problem which can arise if RS232 exceeds fifty feet is a possible increase in erratic operation. Often erratic operation problems manifest in errors that look like disc or CPU errors which are not associated with communications, so a user may waste time and money looking for an error in the wrong place.

However, with the advent of modern needs, RS232 connections are often pushed well past the fifty foot limit, and some connections have been pushed to over one thousand feet.

To increase accuracy, RS422 was developed. RS422 is shown in FIG. 3, and adds a mirror image signal $DS_{1M}$ and $DS_{2M}$, in each direction. The transmitted data signal thus becomes a differential pair and can be received more accurately. In design concept, the receiving unit merely needs to look at the difference between the two lines $M_1$ and $M_{1M}$ or $M_2$ and $M_{2M}$ to determine if a "1" or a "0" has been transmitted.

While somewhat successful, even the RS422 still has drawbacks and still may generate errors, especially if used over great distances.

The inventor has discovered that the ground wire G used in RS232 and in RS422 has been a source of the errors commonly associated with these connections. As clearly seen in FIGS. 2 and 3, the ground lead G ties the grounds $G_T$ and $G_R$ together. However, the inventor has discovered that ground level potential associated with one unit, such as unit T, may be different from that ground level potential associated with another unit, such as unit R. This is especially the case if lightning strikes in the vicinity of the connection or of either unit. Switching of adjacent electrical equipment may also disturb a local ground.

Such ground level potential difference may even generate a voltage potential. However, any differences in ground potential are generally spread out evenly across the logic of a unit. However, if the grounds of the units are coupled together, this difference may be spread out across the logic of all of the units connected by the ground leads, such as ground lead G. The inventor has found that such ground coupling can lead to miscellaneous errors and even hardware damage.

Furthermore, data signals are generally transmitted and received by two tiny, generally inexpensive, chips called line drivers and receivers. The line receiver "receives" both the minute data voltage and the ground voltage. If the ground voltage is large, it may be larger than the data signal, and can thus cause errors in data transmission. Since a metallic ground path violates the integrity of a CPU, memory or disc, even if the unit is turned off, errors can occur. Still further, even in the case of the RS422, the ground wire coupling of units can still create the above-mentioned problems. The problems are exacerbated if voltage spikes or the like are induced in the ground lead.

The inventor has also found that even if elements such as modems, ground isolation elements and the like are used in each element, due to the existence of this ground coupling of the units, the problem still exists.

Yet another problem with the communication cable being connected to the ground leads of each unit is caused if one of the units is subject to voltage spikes or the like as above discussed. Such spikes may find their way onto the ground lead, and disturb any data that is being transmitted via a balanced line circuit. If the balanced line circuit uses the ground lead as a reference, the noise on the ground lead, even common mode type noise, may mask or disturb the small data signals if the circuit uses a differential input amplifier. While theoretically, common mode noise should be cancelled out in such a circuit, in practice, if the noise is high enough, it can saturate component amplifiers or distort their input. In such a case, noise may occur at the output. Any device using such ground and circuitry may be subject to errors, even in such common mode set up.

Still further, if there is any power applied to the connecting lead, any disturbance in such power may find its way to the equipment coupled to the connection lead.

Still a further drawback to many connection leads arises because they are not intended to be used beyond a short distance, and thus do not generally include any means for checking the integrity and polarity of the data signals being transmitted from one unit to another. Thus, a user of a unit that is located a great distance from a sending unit may receive data signals that he considers to be erroneous, and may not realize that the data signal was sent out incorrectly. This may lead to expensive checking of the system, and even downtime while a problem is being traced.

However, any communications system that requires great expense and effort to retrofit onto existing systems will not be able to achieve its fullest commercial success.

Therefore, there is a need for a data communications transceiver which prevents undesired coupling between data stations, especially via ground leads, yet which does so in an economic manner which is easily retrofit onto an existing system and which will permit high speed (i.e., 9600 baud) data transmission which is accurate and can occur over long distances (i.e., greater than fifty feet).

OBJECTS OF THE INVENTION

It is a main object of the present invention is to provide a data communications transceiver which prevents undesired coupling between data stations.

It is another object of the present invention to provide a data communications transceiver which prevents undesired coupling between data stations, especially via ground leads.

It is another object of the present invention to provide a data communications transceiver which prevents undesired coupling between data stations, especially via ground leads, yet which does so in an economic manner which is easily retrofit onto an existing system which includes a metallic line conductor.

It is another object of the present invention to provide a data communications transceiver which prevents undesired coupling between data stations, especially via ground leads, yet which does so in an economic manner which is easily retrofit onto an existing system and which will permit high speed (i.e., 9600 baud) data transmission.

It is another object of the present invention to provide a data communications transceiver which prevents undesired coupling between data stations, especially via ground leads, yet which does so in an economic manner which is easily retrofit onto an existing system and which will permit high speed (i.e., 9600 baud) data transmission which is accurate and can occur over long distances (i.e., greater than fifty feet).

It is another object of the present invention to provide a data communications transceiver which prevents undesired coupling between data stations, especially via ground leads, yet which does so in an economic manner which is easily retrofit onto an existing system and which will permit high speed (i.e., 9600 baud) data transmission which is accurate and can occur over long distances (i.e., greater than fifty feet) and which is able to virtually eliminate the effects of common mode noise on the data signal.

It is another object of the present invention to provide a data communications transceiver which prevents undesired coupling between data stations, especially via ground leads, yet which does so in an economic manner which is easily retrofit onto an existing system and which will permit high speed (i.e., 9600 baud) data transmission which is accurate and can occur over long distances (i.e., greater than fifty feet) and which does not expose the communications network to power surges.

It is another object of the present invention to provide a data communications transceiver which prevents undesired coupling between data stations, especially via ground leads, yet which does so in an economic manner which is easily retrofit onto an existing system and which will permit high speed (i.e., 9600 baud) data transmission which is accurate and can occur over long distances (i.e., greater than fifty feet) and which is adaptable to the inclusion of signal conditioning elements.

It is another object of the present invention to provide a data communications transceiver which prevents undesired coupling between data stations, especially via ground leads, yet which does so in an economic manner which is easily retrofit onto an existing system and which will permit high speed (i.e., 9600 baud) data transmission which is accurate and can occur over long distances (i.e., greater than fifty feet) and which is adaptable to the inclusion of signal conditioning elements whereby signal amplification and inversion can occur on all or some of the signals being transmitted from one data station to another.

SUMMARY OF THE INVENTION

These, and other, objects are achieved by a data communications transceiver which totally isolates the ground circuit of each unit to which a data communications line is connected from that data communications line. The isolation is achieved by using optical coupling to couple the line to the unit, and establishing a physical gap between the line and the unit. The optical coupler is powered by a power source which is totally separate from the power source of any unit to which the data communications line is connected, and can be further protected using special power filtering and surge suppressor elements. The gap is sized so that a lightning strike will not bridge that gap.

The system further uses a truly balanced line receiver in which the only component connected to the receiving end of the connecting cable is an optical source which is optically connected to a photodetector. The source will simply turn on and off depending on the current flow in the line, and electrical common mode noise in the line will not influence the coupling. Thus, the optical coupler can be viewed as a perfect differential digital receiver.

Using the system of the present invention, the advantage of fiber optic communications can be realized to prevent the ground path of one unit from being electrically coupled to the ground path of another unit via a ground line of a connecting line.

However, the optical coupler of the present invention is used in conjunction with a metallic line conductor so that expensive retrofitting of an existing system with fiber optic cables is avoided.

The use of an optical coupler which has a power source that is totally isolated from the power sources associated with any units in the system results in advantages of fiber optic isolation along with an increase in data transmission speed and accuracy as well as an elimination of communication errors associated with a totally metallic path from one unit to another.

BRIEF DESCRIPTION OF THE DRAWING FIGURES

DETAILED DESCRIPTION OF THE PREFERRED EMBODIMENT OF THE INVENTION

Figure 1:
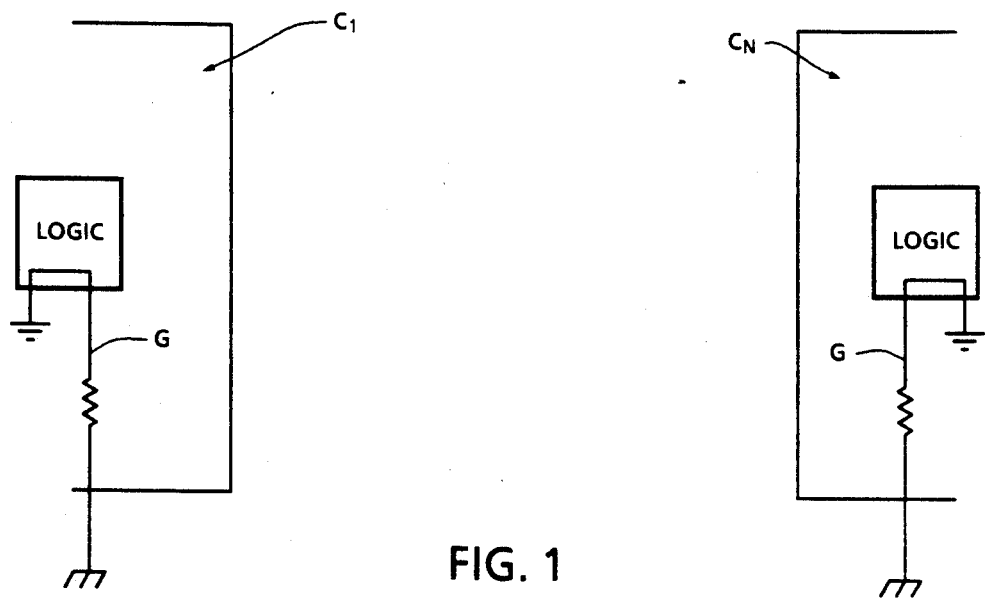
FIG. 1 illustrates a prior art setup which includes two stand alone units.
Figure 2:
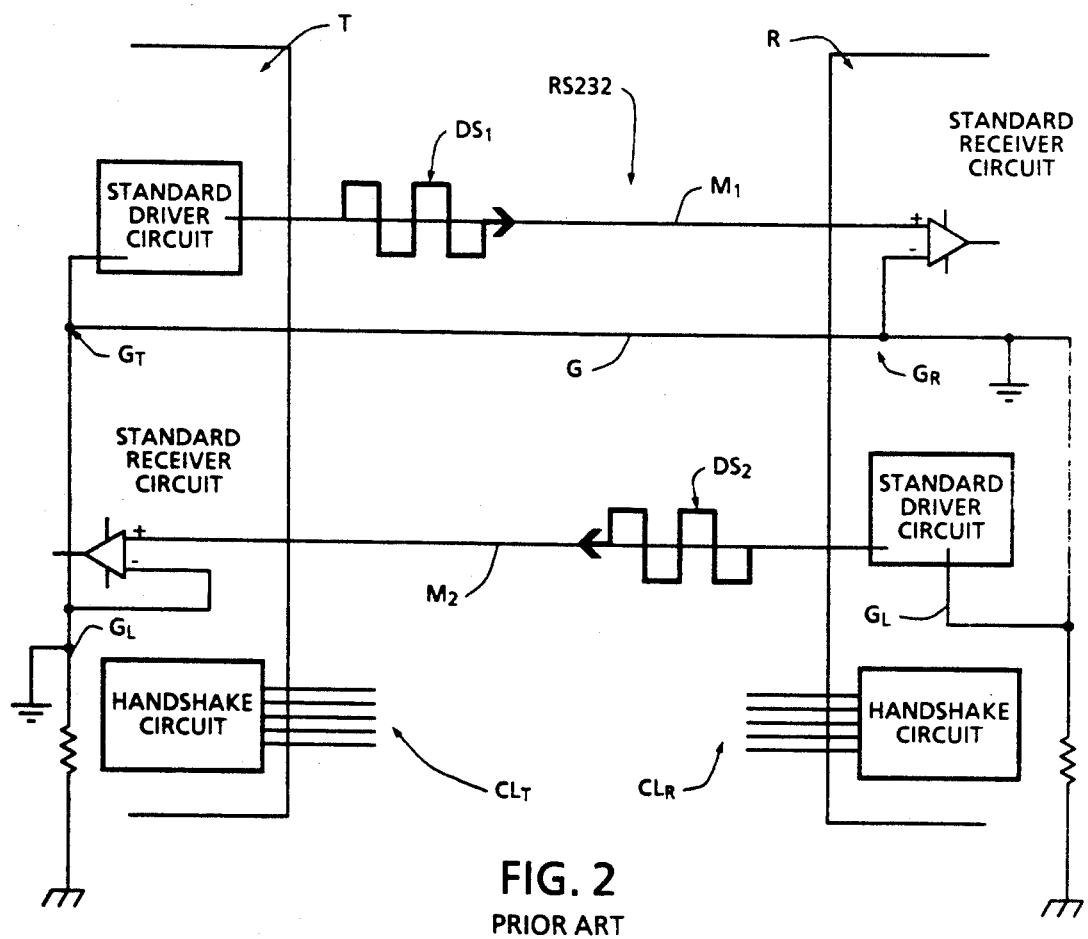
FIG. 2 illustrates a prior art setup in which two units are connected by an RS232 line conductor to facilitate the transfer of data from one unit to another.
Figure 3:
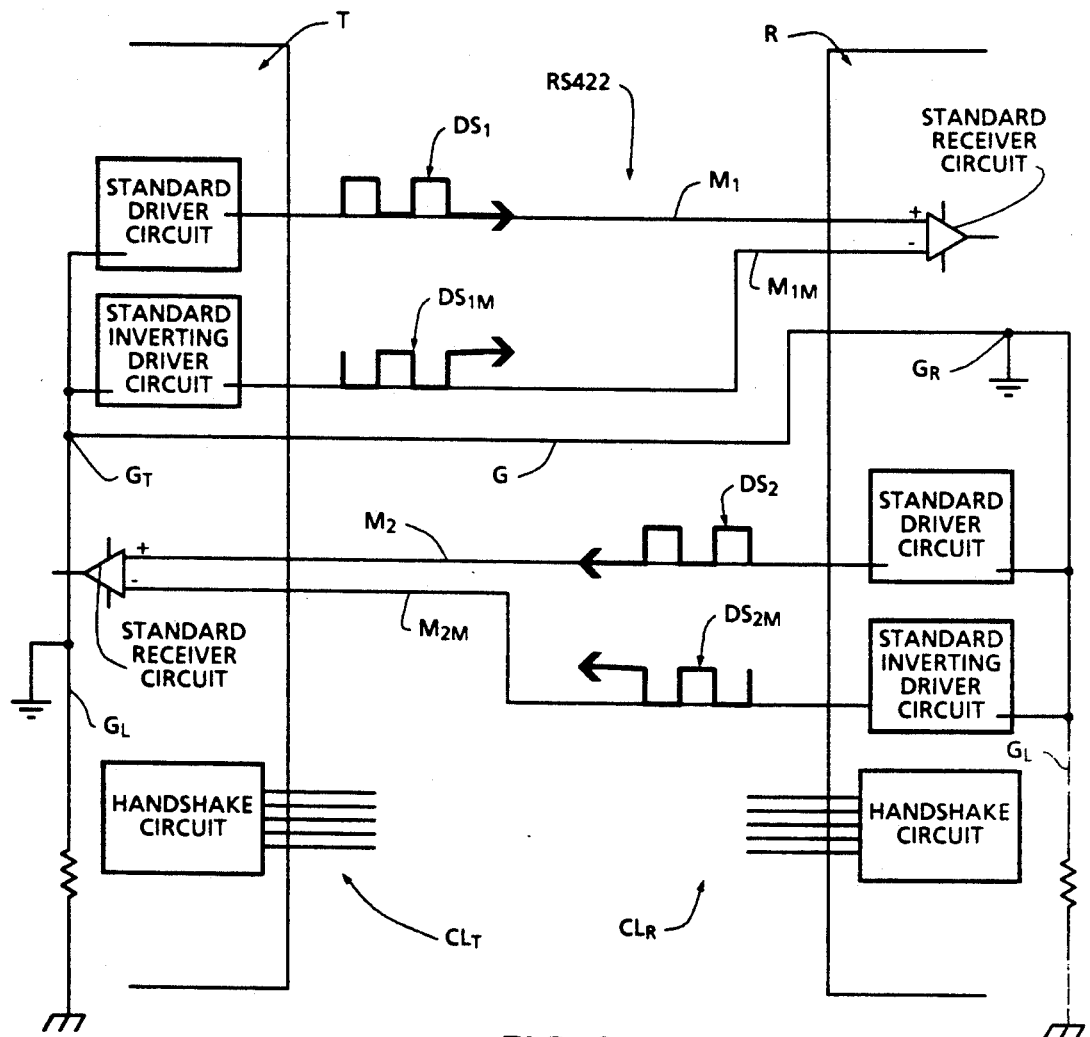
FIG. 3 illustrates a prior art setup in which two units are connected by an RS422 line conductor to facilitate the transfer of data from one unit to another.
Figure 4:
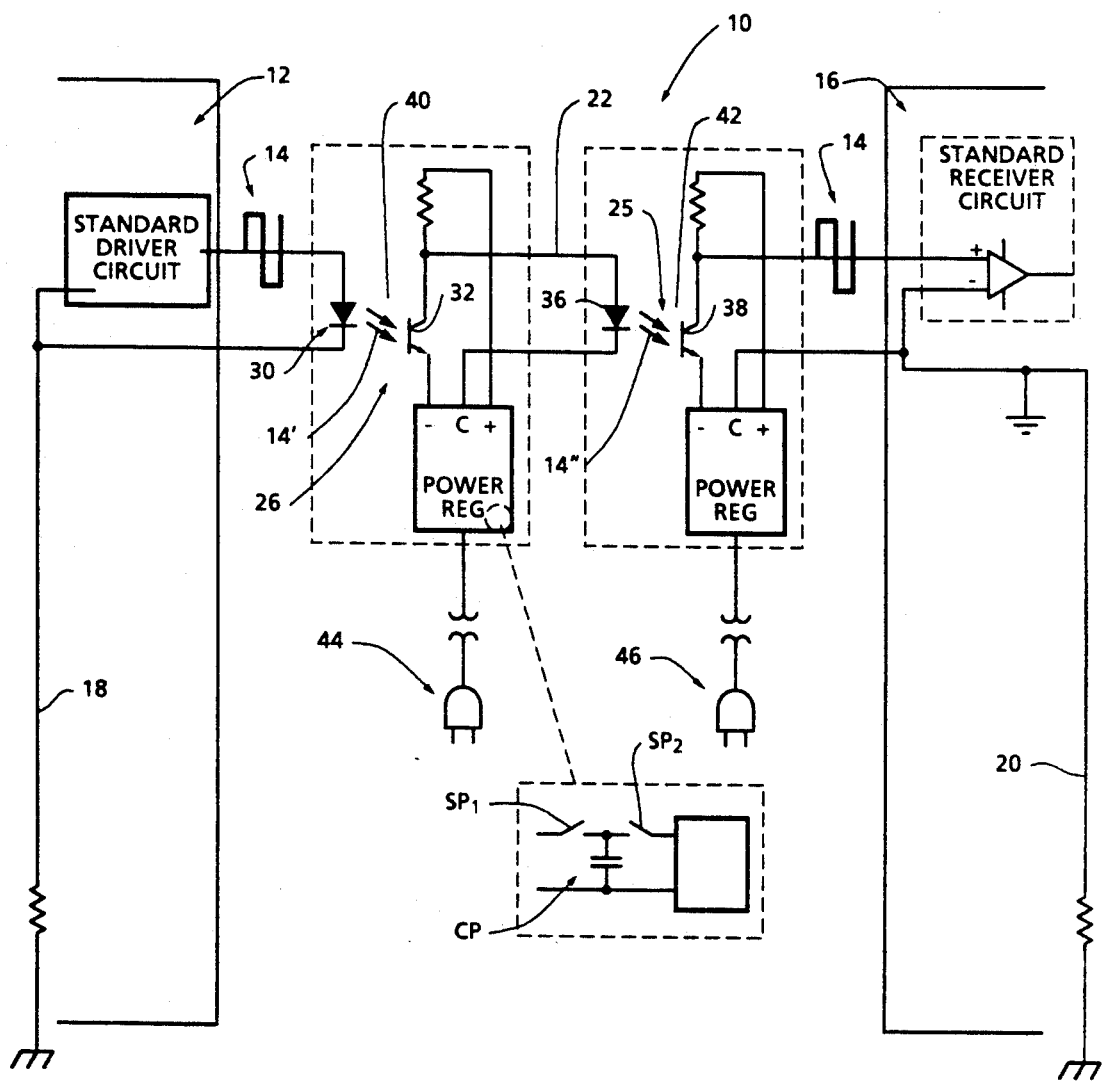
FIG. 4 illustrates the present invention in which an optical coupler is used to connect a metallic line conductor to an associated unit so that the ground path of each unit is separated from the conductor and from any other unit in the system.

FIG. 4 illustrates a data communications transceiver configuration 10 embodying the present invention. The configuration or transceiver 10 includes a plurality of separate units, such as computers, printers, displays and the like which send data signals back and forth to each other. For purposes of discussion, the configuration 10 will be considered as including a transmitting station 12 which generates and transmits data signals, such as data signal 14 for use by a receiving station 16.

Each of the units in the system has a power connection and a ground circuit which includes a ground lead, such as ground leads 18 and 20 in units 12 and 16 respectively which communicates with nearly all of the logic elements of the unit. The present invention couples these two units 12 and 16 in a manner such that the ground circuits of the two coupled units are not connected and are totally separate from each other, yet in a manner which permits accurate high speed data signal transmission over long distances, yet does not require major changes in the two units.

The configuration 10 includes a metallic line conductor 22 over which data signal 14 travels from transmitting station 12 to receiving station 16 and which can be well over fifty feet in length. The configuration 10 further includes an optical coupling means which optically couples the metallic line conductor to the transmitter station and to the receiving station.

More specifically, the optical coupling means includes a first optical coupler 26 connecting one end of the metallic line conductor 22 to the transmitting station and a second optical coupler 28 connecting the other end of the metallic line conductor to the receiving station. The optical couplings 26 and 28 break any electrical path between the stations and the metallic line conductor.

Each optical coupling includes an optical source and a photodetector and the appropriate signal conditioning equipment to translate the electrical signals generated by the stations into optical signals. Thus, the optical coupler 26 includes a transmitter optical source 30 connected to the transmitter station in a manner such that data signal 14 from the transmitter station is emitted by the optical source 30 as an optical signal 14' and a line conductor photodetector 32 which is connected to the metallic line conductor and which is located to receive the optical signal 14'. Appropriate equipment is associated with the photodetector 32 to translate the electrical signal 14' back into a signal that is appropriate to the metallic line conductor, and that signal is then transmitted along the line conductor to the other end thereof. At the other end of the line conductor, the optical coupler 28 includes a line conductor optical source 36 which is connected to the line conductor via appropriate circuitry and which generates an optical signal 14" which corresponds to the data signals 14 and 14'. The optical coupler 28 further includes a receiver photodetector 38 which is connected to the receiver station 16 via appropriate circuitry to translate the optical signal 14" back into a data signal appropriate to the receiver station 16.

Each photodetector of the optical coupling means is physically spaced apart from the adjacent optical source to define a gap, such as gaps 40 and 42 in optical couplings 26 and 28 respectively. These gaps are sized so that a potential difference thereacross which is associated with a lightning strike will not cause a spark to jump the gap. As a benchmark, the gaps can be sized so that a potential difference of approximately seven thousand volts thereacross will not cause a spark to jump the gap.

As can be seen in FIG. 4, the optical couplings 26 and 28 are the sole connection between the metallic line conductor 22 and the transmitting and receiving stations, and thus there is no electrical path between the ground circuits of these two stations.

The optical couplings 26 and 28 are powered from a suitable power source means, with plug elements 44 and 46 being associated with the optical couplers 26 and 28 respectively. As can be seen in FIG. 4, the power source means associated with the optical coupling means is totally separate from the power sources of the units, such as transmitting station 12 and receiving station 16, which are totally separate from each other. In this manner, there is no possibility that a ground path may be established between the ground circuit of any of these assemblies 12, 16, 22, 26 or 28.

It is also noted that power can be used from the terminal by proper charge coupling circuitry. For example, as indicated in FIG. 4, the plug element 44 can be associated with a capacitor CP that is connected to the power for unit 12 via a switch SP1 and is connected to the plug element via a switch SP2. The switch SP1 is closed to charge the capacitor, and when switch SP1 is closed, switch SP2 is open. The line can be powered from the capacitor by opening switch SP1 and closing switch SP2. While FIG. 4 shows the capacitor associated with plug 44 and unit 12, a similar capacitor and switch combination can be associated with the plug 46 and the unit 16.

The optical sources and the photodetectors can be any of those elements known to those skilled in the art and are fully disclosed in standard textbooks such as "Fiber Optics Handbook for Engineers and Scientists" by Frederick C. Allard and published by McGraw-Hill Publishing Company in 1990, the disclosure of which is incorporated herein by reference, or catalogs such as "Optoelectronics Data Book" published by TRW Company in 1986, especially product bulletin number 5246, dated January 1985 and appearing in Section E thereof, the disclosure of which is incorporated herein by reference. For example, the optical source can be selected from any of a number of LED type elements, or any of a number of laser diodes or the like. Drive circuits which are appropriate to each such optical source are discussed in the referenced textbook and catalog, and attention is directed thereto. The photodetectors can also be selected from any number of pn and PIN photodetectors, avalanche photodetectors, or the like as is also discussed in the referenced textbook and catalog. Again, circuit elements appropriate to such detectors is discussed in the referenced textbook, and attention is directed thereto.

Figure 5:
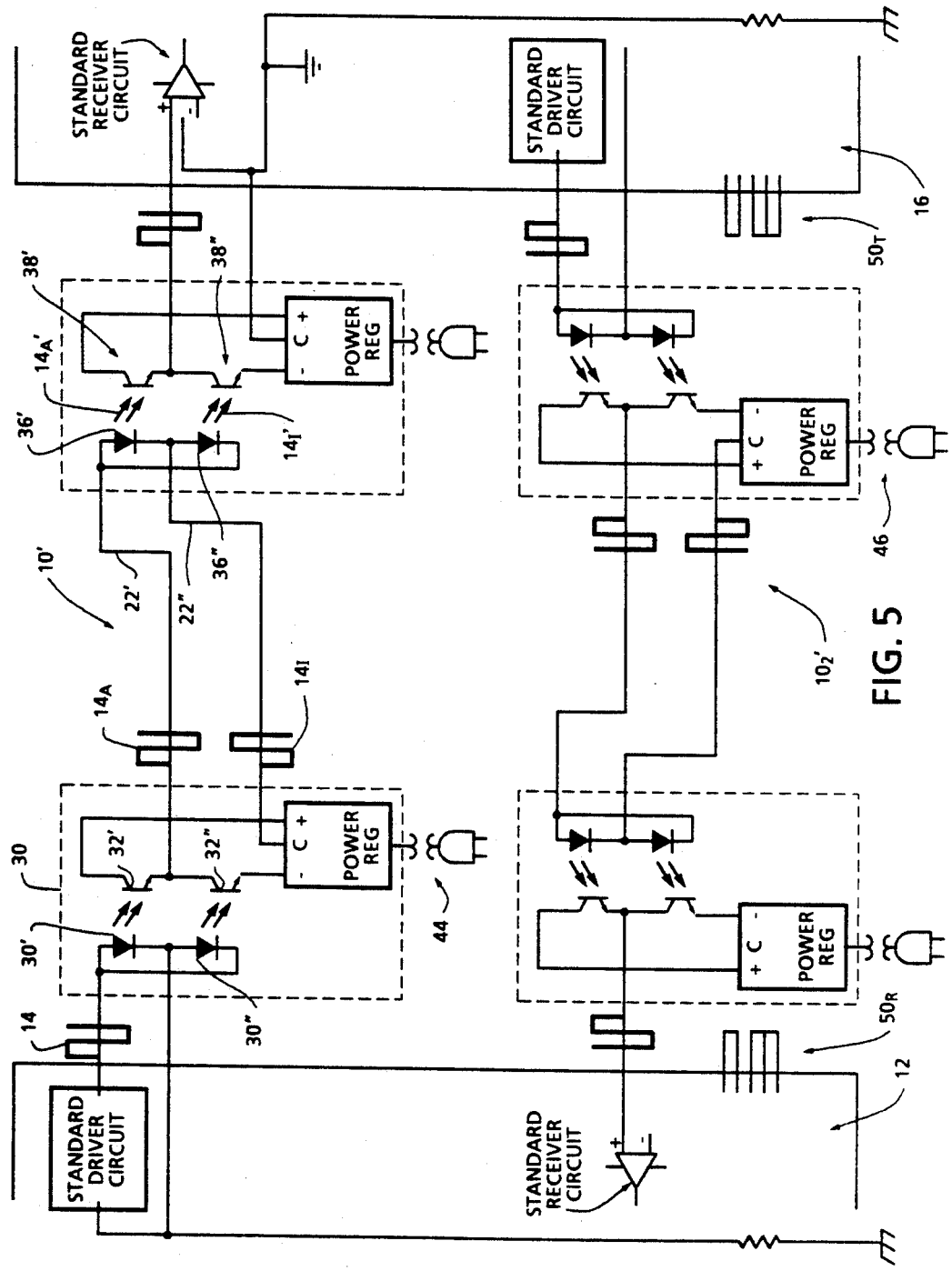
FIG. 5 illustrates the present invention in which mirror image differential signals are used to amplify a data signal, and in which a true balanced line receiver is established.

Referring next to FIG. 5, the configuration 10' is shown to include a balanced line concept in which common mode disturbances will not create errors in the transmitted data signals, and so the receiving end may always accurately mirror the polarity of the transmitted signal. The configuration 10' uses a mirror image type of transmission pattern in which an algebraic sum of two signals is used to form a final data signal. Thus, the configuration 10' includes two metallic line conductors 22' and 22" which have line photodetectors 32' and 32" and phototransmitters 30' and 30" thereon in position to receive optical signals from transmitter optical source 30. As is indicated in FIG. 5, there are appropriate amplifier circuit elements or drive transistors and bipolar power supplies associated with the photodetector 32' to amplify the signal 14 into a signal 14A, whereas, there are appropriate elements associated with the line photodetector 32" which amplify the signal 14 and invert it into a mirror image signal 14I. The signals 14A and 14I are transmitted along the line conductors 22' and 22" and are transmitted as optical signals 14A' and 14I' by optical sources 36' and 36" to a receiver photodetectors 38 and 38". The receiver photodetectors 38' and 38" thus receive a combined signal that represents an algebraic sum of the two signals. Such summing will be totally immune to common mode noise on the lines 22' and 22" as there is a simple addition of signals without reference to any ground signal so common mode noise or common mode disturbances will totally cancel out. The mirror image combinations will also increase the accuracy of the received signal, and represents a balance pair of a truly balanced line receiver. There is no ground connection and thus the above-discussed balanced pair occurs.

As is also shown in FIG. 5, data signals can be transmitted from the receiver station 16 back to the transmitting station 12 via a second setup $10'_2$ that operates and functions in a manner similar to that just described in relation to the line conductors 22' and 22". Similarly, multiple circuits may be added. These multiple circuits can be designed to use one common return path to reduce the total number of conductors and maintain the advantages defined herein.

Both setups will include appropriate power means as indicated at 44 and 46 in FIG. 5.

As is also shown in FIG. 5, the transmitting station and the receiving station have multiple signal lines 50T and 50R which are also connected to the optical coupling means so that signals associated with these lines will also be transmitted via the optical coupling means. Alternatively, in practice, they may be jumped or provided with fixed polarities as required. They may also provide power to the device side circuitry.

The use of differential drivers and receivers also allows the receiving end to always be a mirror image of the transmitting end without possibility of ambiguity with regard to polarity and also allows higher speed performance. This is because the current on the communication circuit is always driven negative or positive to immediately correspond to the transmitted polarity.

Figure 6:
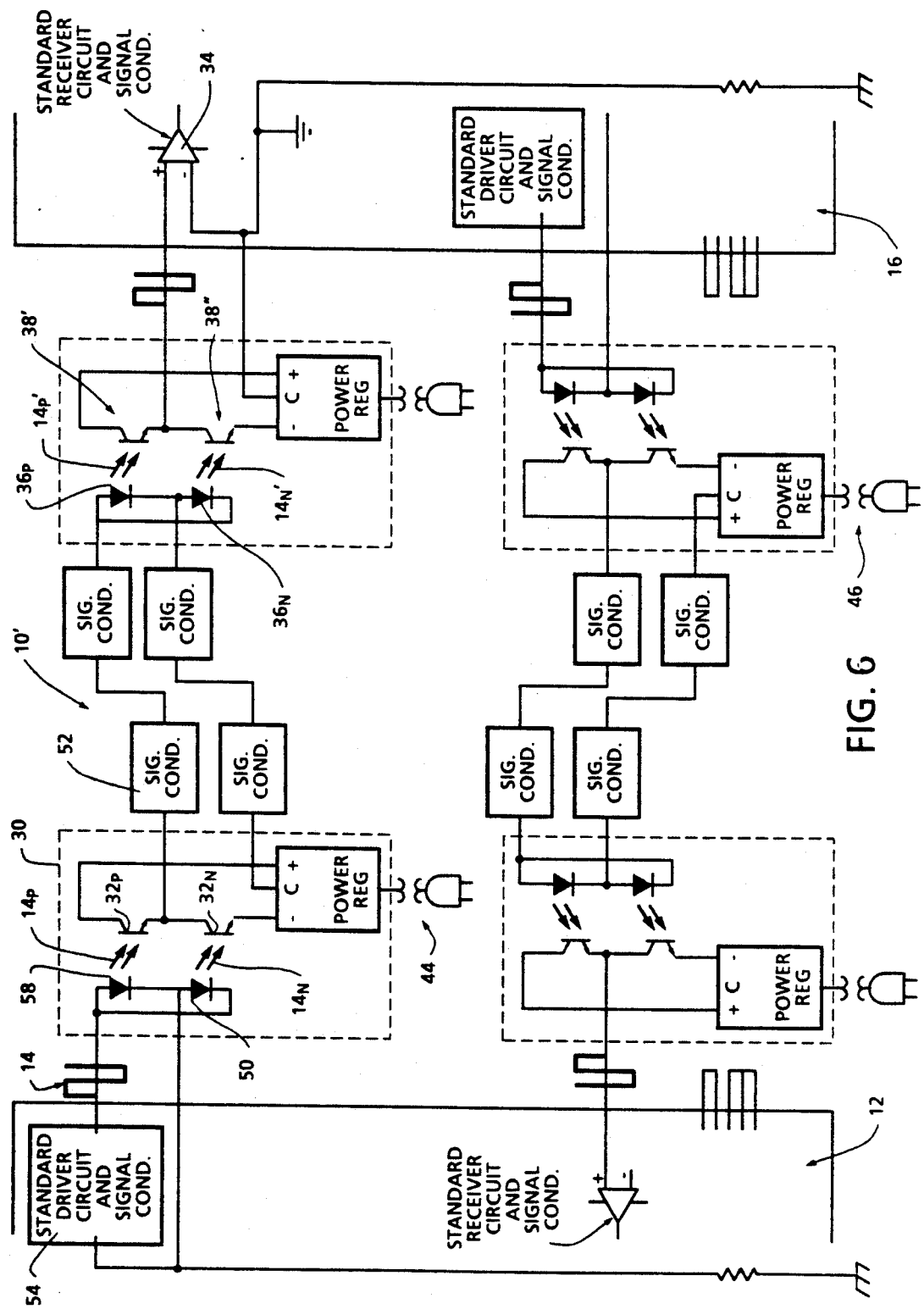
FIG. 6 illustrates the present invention in which various signal conditioning elements are included.

Referring next to FIG. 6, the configuration is shown to include suitable circuit means, such as inductor lights, multiplexers, driver stages, coders, "OR"ing diodes, and the like as indicated by blocks 52. As is also shown in FIG. 6, signal conditioning means 54 can be associated with each station, and such signal conditioning means can include amplifiers and the like.

The optical sources are also shown in FIG. 6 to include two LEDs 58 and 60 which are connected to emit an optical signal according to the direction of current in the signal line so that diode 58 emits an optical signal 14P when the signal 14 is positive and diode 60 emits an optical signal 14N when signal 14 is negative. The signals 14P and 14N are incident on photodetectors 32P and 32N respectively, and re-emitted as optical signals 14P' and 14N' by optical sources 36P and 36N respectively. The signals 36P and 36N are incident on the multiple receiver photodetector in element 38, one for negative and one for positive current. A data signal from the receiver station to the transmitter station is transmitted in a similar manner. Power is supplied to the optical coupling means by connectors 44 and 46 and similar connectors in the manner discussed above so that the line conductors and optical coupling means are all separate and independent of any ground circuit in the stations, such as transmitter station and receiver station.

The circuit elements 52 and 54 can include circuit means for relaying digital data signals as well as driver circuits and the like associated with such data signals. Those skilled in the art will be able to determine exactly what elements are necessary to accomplish such results based on the teaching of textbooks such as the referenced Fiber Optics text, or the TRW catalog, as well as others.

Figure 7:
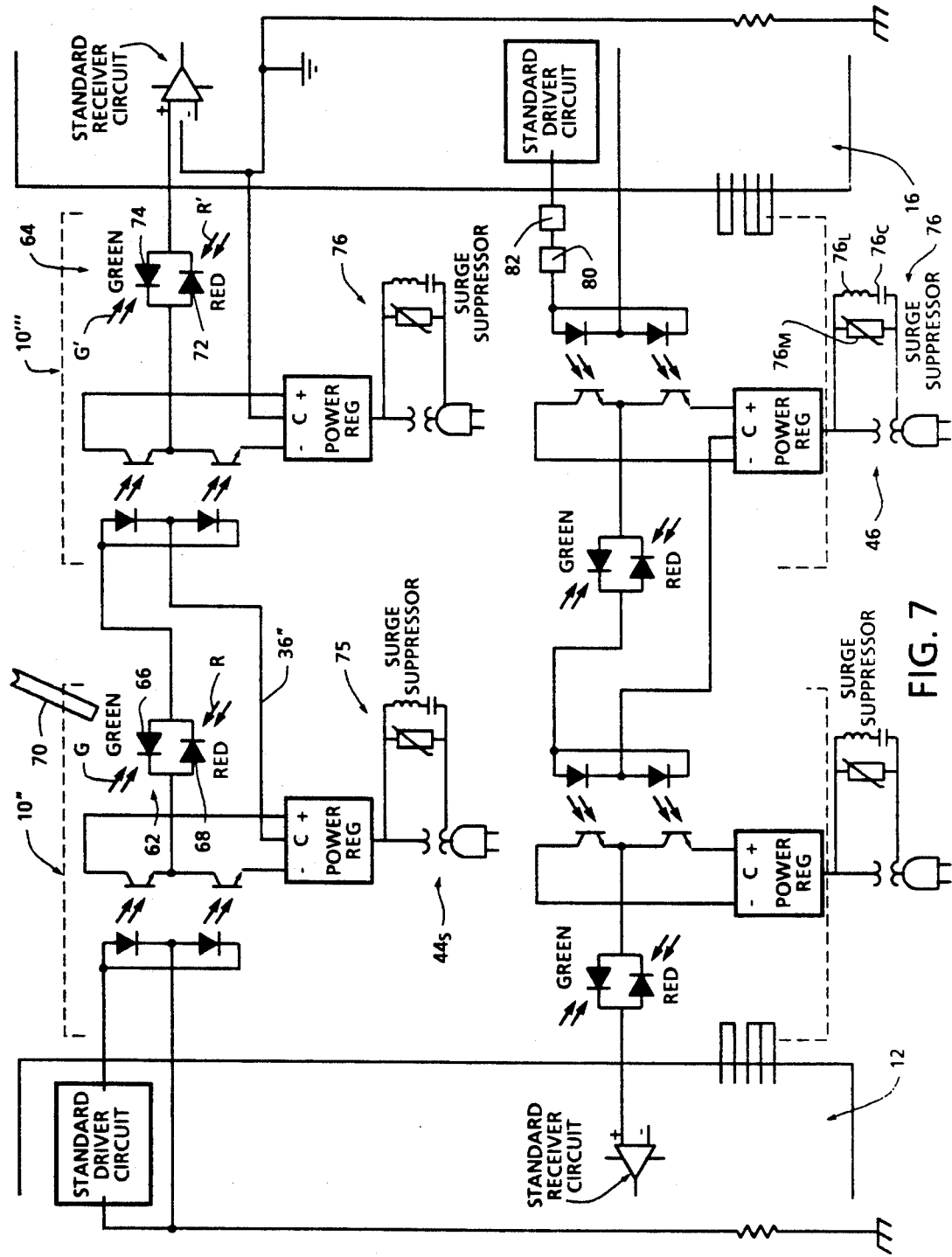
FIG. 7 illustrates the present invention in which signal integrity and polarity can be checked at various points along a long data communications line, and which includes power surge protectors on the data communications line.

Shown in FIG. 7 is are configurations 10" and 10''', both of which includes an integrity and polarity checking means on the line conductors and on the receiving station signal receiving lines, as well as surge protection means on the optical coupling means power source means. For the sake of convenience, only two integrity and polarity checking means are shown and only two surge suppressor means are shown, however, it should be understood that other checking means and other surge suppressors can be used without departing from the scope of this disclosure.

The integrity and polarity checking means includes a signal circuit 62 on the line conductor and a signal circuit 64 on the receiver station. Each signal circuit includes an optical source, such as an LED 66 connected to emit an optical signal R when current in the line conductor is in one direction and a second LED 68 connected to emit an optical signal G when current in the line conductor is in the opposite direction. The emitted optical signals can be conducted by a fiber optic cable 70 to a suitable viewing location. The associated signal circuit 64 includes an LED 72 which emits optical signal R' when the data signal is in one direction and optical signal G' when the data signal is in the opposite direction. The signals R' and G' correspond to the signals R and G so that a polarity and integrity check can be made. This is required since the configuration system of the present invention permits transmission of data signals over great distances. As shown in FIG. 7, one circuit means 62 is located adjacent to the transmitting station and one circuit means 64 is located adjacent to the receiving station. However, there can be several circuit means 62 placed at various locations along the line conductor if necessary. Appropriate resistors can be included in the circuit means 62 and 64 to ensure that undue amounts of power are not tapped off by such circuit means.

Figure 10:
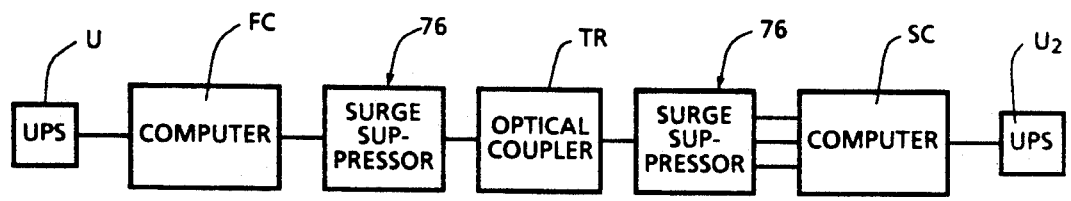
FIG. 10 shows the transceiver of the present invention being used as a repeater for a long data line.

Each of the configurations 10" and 10"' also includes surge suppressors 76 on the power source means associated with the optical coupling means. These surge suppressors can include an MOV (Metal Oxide Variator) element 76M, capacitors 76C and inductors, such as inductor 76L, as well as an inductor in the line as indicated at L in element 44S. Other suppressor elements, such as capacitors or the like can be inserted in the line adjacent to the inductor L if suitable. An uninterruptible power supply U can also be included in the power source, one example of a suitable uninterruptible power supply is disclosed in U.S. Pat. No. 4,675,538, the disclosure of which is incorporated herein by reference. The use of an uninterruptible power supply is indicated in FIG. 10. As shown in FIG. 10, a first computer FC with an uninterruptible power supply U communicates with a second computer SC having its own uninterruptible power supply U2. The data line can be as much as two miles long, and the configuration network TR of the present invention including its own uninterruptible power supply can be inserted into the long data line and function as a repeater. The configuration network TR can also include an integral battery backup to continue critical communications in case of a blackout at the repeater location.

Figure 9:
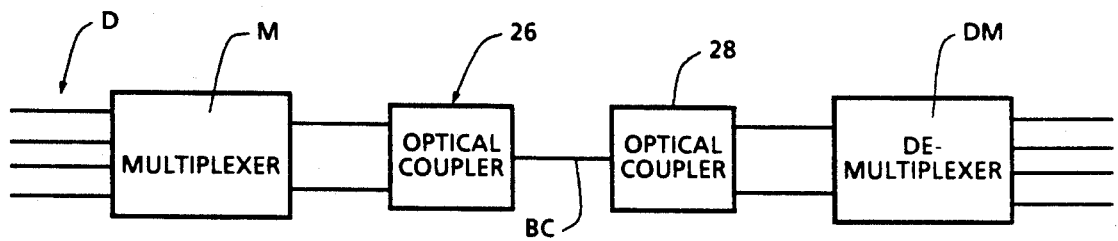
FIG. 9 shows multiplexer logic that can be used in conjunction with the transceiver of the present invention.

The configuration of the present invention permits the accurate transmission of data over long distances, for example distance exceeding one thousand feet. FIG. 9 shows multiplexer logic that can be used in conjunction with the configuration of the present invention. Thus, multiplexers M and demultiplexers D can be included to allow multiple lower speed data circuits, such as data circuit D which includes a plurality of 1200 baud lines, to be merged into a higher speed data stream, such as 4800 baud line BL over the long distance data circuit and then separated at the receiving end to a multiplicity of stations. The configuration can also be used in party line voting or polling arrangements if desired.

A modification of the optical coupling means includes circuit means 80 which develops a timing signal or strobe signal which could, for example, be based upon "dark" time when neither optical source 36 is turned on. Such "dark" time occurs when the data signal is switching states from positive to negative, and the circuit means 80 will be designed to operate until the voltage is large enough to exceed the forward breakdown voltage of the optical source.

Furthermore, the preferred form of the configuration includes circuit means 82 which is "transparent" on start up or after a power failure so that the circuit does not lock up because the initialization of control leads on a computer side may not be in the sequence expected by a computer after such an occurrence. Such circuit elements can include, if suitable, means for defining a dead zone or threshold, and would be used in conjunction with the optical sources. This circuit would include a timing signal or a strobe signal that is based on dark time when none of the optical sources are emitting an optical signal. This circuit will be used when the data signals are switching states from positive to negative and vice versa, and unit the voltage is large enough to exceed the forward breakdown voltage of the optical source, especiallY if that source is an LED.

Figure 8:
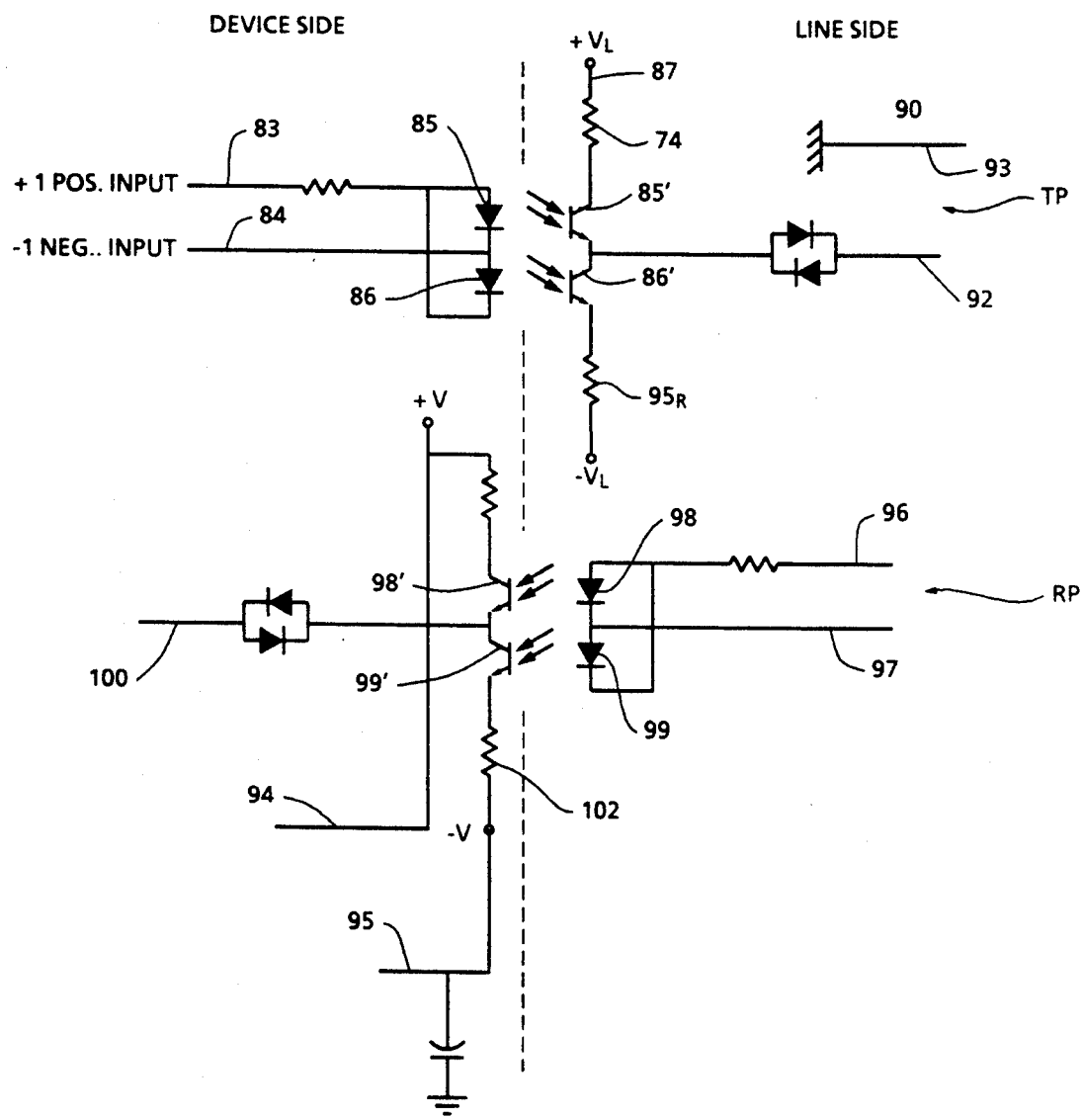
FIG. 8 shows a circuit diagram of the data communications transceiver of the present invention.

FIG. 8 shows a circuit diagram of the data communications configuration of the present invention. Referring to FIG. 8, it is seen that the configuration includes a transmit portion TP. Positive and negative voltage, derived from a separate line source transformer, such as a source connected to plug 46 in FIG. 5, is shown at 87 and 88 with voltage return 93.

Input data is received from the transmitting station on leads 83 and 84. Optocoupler diodes 85 and 86 turn on respectively for positive or negative data current. Isolated data line 92 follows respectively with current based upon source voltage, and limit resistors 94R, 95R as switched by optocoupler output transistors 85' and 86'. The data output pair comprises element 92 and voltage return lead 93. Lights 91 follow the polarity of the transmitted data as described above.

The received data circuit RP is similar with voltage sources 94, 95 derived from the transmitting station. Input data from the distant end is received on leads 96 and 97. Note that the typical source would be a similar circuit at the distant end with leads 92 and 93 connected respectively to 96 and 97. Diodes 98 and 99 follow respectively so the voltage in data output lead 100 follows the distance input data signal from a similar circuit at the other end connected to the equivalent of elements 83 and 84.

Computer terminal side voltage may be by a separate source or derived from the terminal as positive, 94, negative, 95, and return 100. Resistors 101 and 102 limit output current and lights 103 "echo" lights 91 if all connections are correct.

Such circuits may be used at both ends of data or telemetry circuits, one end or in tandem along long circuits. Furthermore, the configuration of the present invention can be expanded to multiple data lines, clock pulses for synchronous lines and general telemetry, current loop, or voltage loop applications from DC through the speed range of the described circuitry.

It is understood that while certain forms of the present invention have been illustrated and described herein, it is not to be limited to the specific forms or arrangements of parts described and shown.

I claim:

1. A data communication transceiver that prevents undesired coupling between data stations comprising:
   A) a transmitting station which generates and transmits data signals, and which includes a ground circuit means and a power source;
   B) a receiving station which receives said data signals and which includes a ground circuit means and a power source;
   C) a plurality of metallic line conductors located between said transmitting station and said receiving station and which carries said data signals;

D) optical coupling means optically coupling each of said metallic line conductors to said transmitting station to transfer said data signal to each of said metallic line conductors and optically coupling each of said metallic line conductors to said receiving station to transfer said data signals to said receiving station, said optical coupling means including a power source means which is separate from said transmitting station power source and separate from said receiving station power source, a first transmitter optical source connected to said transmitting station and generating a first optical data signal, a second transmitter optical source connected to said transmitting station and generating a second optical data signal, said second optical data signal being a mirror image of said first optical data signal, a first transmitter photodetector located to receive said first optical data signal and coupled to a first metallic line conductor, a second transmitter photodetector located to receive said second optical data signal and coupled to a second metallic line conductor, a first receiver optical source connected to said first metallic line conductor to receive and transmit said first optical data signal, a second receiver optical source connected to said second metallic line conductor to receive and transmit said second optical data signal, a first receiver photodetector located to receive said first optical data signal from said first receiver optical source, a second receiver photodetector located to receive said second optical data signal from said second receiver optical source, said first and second receiver photodetectors being coupled together and algebraically combining said first and second optical data signals; and E) said transmitting station ground circuit means being separate from said receiving station ground circuit.

2. The data communications transceiver defined in claim 1 wherein said optical coupling means is the sole connection between said metallic line conductor and said transmitting station and between said metallic line conductor and said receiving station.

3. The data communications transceiver defined in claim 2 wherein each transmitter optical source is physically spaced from each of said line conductor photodetector to define a data input gap therebetween, and each line conductor optical source is physically spaced from each receiver photodetector to define a data output gap therebetween.

4. The data communications transceiver defined in claim 3 further including circuit means for dividing said data signal into a plurality of states.

5. The data communications transceiver defined in claim 2 wherein said transmitting station further includes multiple signal lines.

6. The data communications transceiver defined in claim 5 wherein said receiving station includes multiple signal lines.

7. The data communications transceiver defined in claim 3 wherein said metallic line conductor includes a plurality of individual metallic wires with each metallic wire of said plurality of metallic wires being connected at one end thereof to one of said line conductor photodetectors and being connected at another end thereof to one of said line conductor optical sources.

8. The data communications transceiver defined in claim 3 wherein said data input gap and said data output gap are both large enough so that an electric potential of three thousand volts or less thereacross will not be sufficient to cause an electric discharge between said metallic line conductor and said transmitting station or between said metallic line conductor and said receiving station via said optical coupling means.

9. The data communications transceiver defined in claim 1 further including a third metallic line conductor, and said optical coupling means further including means for optically coupling said third metallic line conductor to said transmitting station and to said receiving station.

10. The data communications transceiver defined in claim 9 wherein said optical coupling means is the sole connection between said third line conductor and said transmitting station and between said third line conductor and said receiving station.

11. A data communication transceiver that prevents undesired coupling between data stations comprising:
A) a transmitting station which generates and transmits data signals, and which includes a ground circuit means and a power source;
B) a receiving station which receives said data signals and which includes a ground circuit means and a power source;
C) first and second metallic line conductors which carry said data signal;
D) optical coupling means optically coupling said metallic line conductors to said transmitting station to transfer said data signal to said metallic line conductors and optically coupling said metallic line conductors to said receiving station to transfer said data signals to said receiving station, said optical coupling means including a first transmitter optical source connected to said transmitting station and generating a first optical data signal, a second transmitter optical source connected to said transmitting station and generating a second optical data signal, a first transmitter photodetector located to receive said first optical data signal and coupled to a first metallic line conductor, a second transmitter photodetector located to receive said second optical data signal and coupled to a second metallic line conductor, a first receiver optical source connected to said first metallic line conductor to receive and transmit said first optical data signal, a second receiver optical source connected to said second metallic line conductor to receive and transmit said second optical data signal, a first receiver photodetector located to receive said first optical data signal from said first receiver optical source, a second receiver photodetector located to receive said second optical data signal from said second receiver optical source, and a power source means which is separate from said transmitting station power source and separate from said receiving station power source;
E) said transmitting station ground circuit means being separate from said receiving station ground circuit; and
F) data signal amplifying circuit means on said first and second metallic line conductors.

12. A data communication transceiver that prevents undesired coupling between data stations comprising:
A) a transmitting station which generates and transmits data signals, and which includes a ground circuit means and a power source;

B) a receiving station which receives said data signals and which includes a ground circuit means and a power source;

C) first and second metallic line conductors which carry said data signals;

D) optical coupling means optically coupling said metallic line conductors to said transmitting station to transfer said data signals to said metallic line conductors and optically coupling said metallic line conductors to said receiving station to transfer said data signals to said receiving station, said optical coupling means including a first transmitter optical source connected to said transmitting station and generating a first optical data signal, a second transmitter optical source connected to said transmitting station and generating a second optical data signal, a first transmitter photodetector located to receive said first optical data signal and coupled to a first metallic line conductor, a second transmitter photodetector located to receive said second optical data signal and coupled to a second metallic line conductor, a first receiver optical source connected to said first metallic line conductor to receive and transmit said first optical data signal, a second receiver optical source connected to said second metallic line conductor to receive and transmit said second optical data signal, a first receiver photodetector located to receive said first optical data signal from said first receiver optical source, a second receiver photodetector located to receive said second optical data signal from said second receiver optical source, and a power source means which is separate from said transmitting station power source and separate from said receiving station power source;

E) said transmitting station ground circuit means being separate from said receiving station ground circuit; and F) delay circuit means connecting said receiving station optical coupling means photodetector to said receiving station for defining a dead zone threshold.

13. The data communications transceiver defined in claim 12 wherein said delay circuit means includes timing circuit means connected to said optical sources and signal generating means connected to said timing circuit means to generate a signal when no optical source is generating an optical signal.

14. The data communications transceiver defined in claim 13 wherein said signal generating means includes a strobe signal which is optically connected to said photodetectors.

15. A data communication transceiver that prevents undesired coupling between data stations comprising:

A) a transmitting station which generates and transmits data signals, and which includes a ground circuit means and a power source;

B) a receiving station which receives said data signals and which includes a ground circuit means and a power source;

C) first and second metallic line conductors which carry said data signals;

D) optical coupling means optically coupling said metallic line conductors to said transmitting station to transfer said data signals to said metallic line conductors and optically coupling said metallic line conductors to said receiving station to transfer said data signals to said receiving station, said optical coupling means including a first transmitter optical source connected to said transmitting station and generating a first optical data signal, a second transmitter optical source connected to said transmitting station and generating a second optical data signal, a first transmitter photodetector located to receive said first optical data signal and coupled to a first metallic line conductor, a second transmitter photodetector located to receive said second optical data signal and coupled to a second metallic line conductor, a first receiver optical source connected to said first metallic line conductor to receive and transmit said first optical data signal, a second receiver optical source connected to said second metallic line conductor to receive and transmit said second optical data signal, a first receiver photodetector located to receive said first optical data signal from said first receiver optical source, a second receiver photodetector located to receive said second optical data signal from said second receiver optical source, and a power source means which is separate from said transmitting station power source and separate from said receiving station power source, said optical coupling means further including a surge suppressor means connected to said optical coupling means power source means for suppressing surges in power to said power source means; and E) said transmitting station ground circuit means being separate from said receiving station ground circuit.

16. The data communications transceiver defined in claim 15 wherein said surge suppressor means includes an inductor element.

17. The data communications transceiver defined in claim 15 wherein said surge suppressor means includes an MOV element.

18. A data communication transceiver that prevents undesired coupling between data stations comprising:

A) a transmitting station which generates and transmits data signals, and which includes a ground circuit means and a power source;

B) a receiving station which receives said data signals and which includes a ground circuit means and a power source;

C) first and second metallic line conductors which carry said data signals;

D) optical coupling means optically coupling said metallic line conductors to said transmitting station to transfer said data signals to said metallic line conductors and optically coupling said metallic line conductors to said receiving station to transfer said data signals to said receiving station, said optical coupling means including a power source means which is separate from said transmitting station power source and separate from said receiving station power source;

E) said transmitting station ground circuit means being separate from said receiving station ground circuit; and F) a data signal integrity means connected to each of said line conductors.

19. The data communications transceiver defined in claim 18 wherein said data signal integrity means includes a data signal continuity and polarity indicating means.

20. The data communications transceiver defined in claim 19 wherein said data signal integrity means includes a first data signal continuity and polarity indicating means located adjacent to said transmitting station.

21. The data communications transceiver defined in claim 20 wherein said data signal integrity means includes a second data signal continuity and polarity indicating means located adjacent to said receiving station.

22. The data communications transceiver defined in claim 21 wherein said data signal integrity means includes an optical source.

23. The data communications transceiver defined in claim 22 wherein said data signal integrity means further includes circuit means which activates said data signal integrity means optical source when said data signal is in a particular state.

24. The data communications transceiver defined in claim 18 wherein said optical coupling means power source means includes a first power source adjacent to said transmitting station and a second power source adjacent to said receiving station.

25. The data communications transceiver defined in claim 24 wherein each of said first and second power source means includes a suppressor element.

26. The data communications transceiver defined in claim 25 wherein each suppressor element includes an inductor.

27. The data communications transceiver defined in claim 25 wherein each suppressor element includes an MOV.

28. The data communications transceiver defined in claim 25 wherein each suppressor element includes a capacitor.

29. The data communications transceiver defined in claim 25 wherein each suppressor element includes an uninterruptible power supply.

30. A data communication transceiver that prevents undesired coupling between data stations comprising:
A) a transmitting station which generates and transmits data signals, and which includes a ground circuit means and a power source;
B) a receiving station which receives said data signals and which includes a ground circuit means and a power source;
C) a metallic line conductor which carries said data signal;
D) optical coupling means optically coupling said metallic line conductor to said transmitting station to transfer said data signal to said metallic line conductor and optically coupling said metallic line conductor to said receiving station to transfer said data signal to said receiving station, said optical coupling means including a power source means which is separate from said transmitting station power source and separate from said receiving station power source;
E) said transmitting station ground circuit means being separate from said receiving station ground circuit; and
F) said optical coupling means power source means including a capacitor coupled to said transmitting station by a first switch and to said optical coupling means by a second switch, with said second switch being closed when said first switch is open, and vice versa.

31. The data communications transceiver defined in claim 30 wherein said optical coupling means power source means includes a capacitor coupled to said receiving station by a first receiving station switch and to said optical coupling means by a second receiving station switch, with said second receiving station switch being closed when said first receiving station switch is open, and vice versa.

32. A data communication transceiver that prevents undesired coupling between data stations comprising:
A) a transmitting station which generates and transmits data signals, and which includes a ground circuit means and a power source;
B) a receiving station which receives said data signals and which includes a ground circuit means and a power source;
C) first and second metallic line conductors which carry said data signals;
D) optical coupling means optically coupling said metallic line conductors to said transmitting station to transfer said data signals to said metallic line conductors and optically coupling said metallic line conductors to said receiving station to transfer said data signals to said receiving station, said optical coupling means including a first transmitter optical source connected to said transmitting station and generating a first optical data signal, a second transmitter optical source connected to said transmitting station and generating a second optical data signal, a first transmitter photodetector located to receive said first optical data signal and coupled to a first metallic line conductor, a second transmitter photodetector located to receive said second optical data signal and coupled to a second metallic line conductor, a first receiver optical source connected to said first metallic line conductor to receive and transmit said first optical data signal, a second receiver optical source connected to said second metallic line conductor to receive and transmit said second optical data signal, a first receiver photodetector located to receive said first optical data signal from said first receiver optical source, a second receiver photodetector located to receive said second optical data signal from said second receiver optical source, and a power source means which is separate from said transmitting station power source and separate from said receiving station power source;
E) said transmitting station ground circuit means being separate from said receiving station ground circuit; and
F) said power supply means including an uninterruptible power supply.

33. A data communication transceiver that prevents undesired coupling between data stations comprising:
A) a transmitting station which generates and transmits data signals, and which includes a ground circuit means and a power source;
B) a receiving station which receives said data signals and which includes a ground circuit means and a power source;
C) first and second metallic line conductors which carry said data signals;
D) optical coupling means optically coupling said metallic line conductors to said transmitting station to transfer said data signals to said metallic line conductors and optically coupling said metallic line conductors to said receiving station to transfer said data signals to said receiving station, said optical coupling means including a power source means which is separate from said transmitting station power source and separate from said receiving station power source, said optical coupling means power source further including separate power supply means to supply power to both station side and line side of the transceiver;

E) said transmitting station ground circuit means being separate from said receiving station ground circuit; and F) multiple transceiver circuits which are in tandem to cover distances of greater than one thousand feet.

34. The data communications transceiver defined in claim 33 further including means for multiplexing and demultiplexing data for merging multiple low speed data circuits into a higher speed data stream and then separating such data at a receiving end to a multiplicity of stations.

35. A data communication transceiver that prevents undesired coupling between data stations comprising:

A) a transmitting station which generates and transmits data signals, and which includes a ground circuit means and a power source;

B) a receiving station which receives said data signals and which includes a ground circuit means and a power source;

C) first and second metallic line conductors which carry said data signals;

D) optical coupling means optically coupling said metallic line conductors to said transmitting station to transfer said data signals to said metallic line conductors and optically coupling said metallic line conductors to said receiving station to transfer said data signals to said receiving station, said optical coupling means including a first transmitter optical source connected to said transmitting station and generating a first optical data signal, a second transmitter optical source connected to said transmitting station and generating a second optical data signal, a first transmitter photodetector located to receive said first optical data signal and coupled to a first metallic line conductor, a second transmitter photodetector located to receive said second optical data signal and coupled to a second metallic line conductor, a first receiver optical source connected to said first metallic line conductor to receive and transmit said first optical data signal, a second receiver optical source connected to said second metallic line conductor to receive and transmit said second optical data signal, a first receiver photodetector located to receive said first optical data signal from said first receiver optical source, a second receiver photodetector located to receive said second optical data signal from said second receiver optical source, and a power source means which is separate from said transmitting station power source and separate from said receiving station power source;

E) said transmitting station ground circuit means being separate from said receiving station ground circuit; and F) coupling means for coupling the transceiver into a party line arrangement.

36. The data communications transceiver defined in claim 35 wherein said party line includes a polling arrangement.

37. The data communications transceiver defined in claim 35 wherein said party line includes a voting arrangement.

* * * * *